United States Patent
Sandusky et al.

[15] 3,662,846
[45] May 16, 1972

[54] BATCH WEIGHING WITH NON-CUMULATIVE DIGITAL CUTOFF

[72] Inventors: Charles F. Sandusky, Morenci, Mich.; William C. Susor, Toledo, Ohio

[73] Assignee: The Reliance Electric and Engineering Company, Toledo, Ohio

[22] Filed: Dec. 23, 1968

[21] Appl. No.: 785,992

[52] U.S. Cl. ................................................. 177/70
[51] Int. Cl. ............................................... G01g 19/22
[58] Field of Search ............ 177/25, 46, 47, 70, 116, DIG. 3; 235/92

[56] References Cited

UNITED STATES PATENTS

| | | | |
|---|---|---|---|
| 2,928,033 | 3/1960 | Abbott | 235/92 |
| 2,974,863 | 3/1961 | Williams, Jr. et al. | 177/DIG. 3 |
| 3,035,648 | 5/1962 | Williams, Jr. | 117/70 |
| 3,169,185 | 2/1965 | Nines | 177/DIG. 3 |
| 3,254,728 | 6/1966 | Aquadro et al. | 177/70 X |
| 3,445,638 | 5/1969 | Montgomerie | 235/92 |
| 3,446,299 | 5/1969 | Leonowicz | 177/25 |
| 3,464,508 | 9/1969 | Engle et al. | 177/116 X |

Primary Examiner—Robert S. Ward, Jr.
Assistant Examiner—George H. Miller, Jr.
Attorney—Thomas H. Grafton

[57] ABSTRACT

A digital cutoff system comprising a weighing scale for producing analog signals in accordance with the desired weights of a plurality of materials successively placed upon the scale, analog-to-digital converter means for changing the analog signals to digital signals, means operable while one or more of the materials are upon the scale for resetting the converter means to cancel the digital signals corresponding to said one or more materials, and circuit means for producing a cutoff signal in response to digital signals corresponding to the desired weight of each of said plurality of materials. By resetting the converter means after each material is weighed and while the load is upon the scale, noncumulative weighing of multiple materials is accomplished with digital control of each material.

4 Claims, 5 Drawing Figures

PATENTED MAY 16 1972

INVENTORS.
CHARLES F. SANDUSKY
BY WILLIAM C. SUSOR

Thomas H. Grafton
ATTORNEY

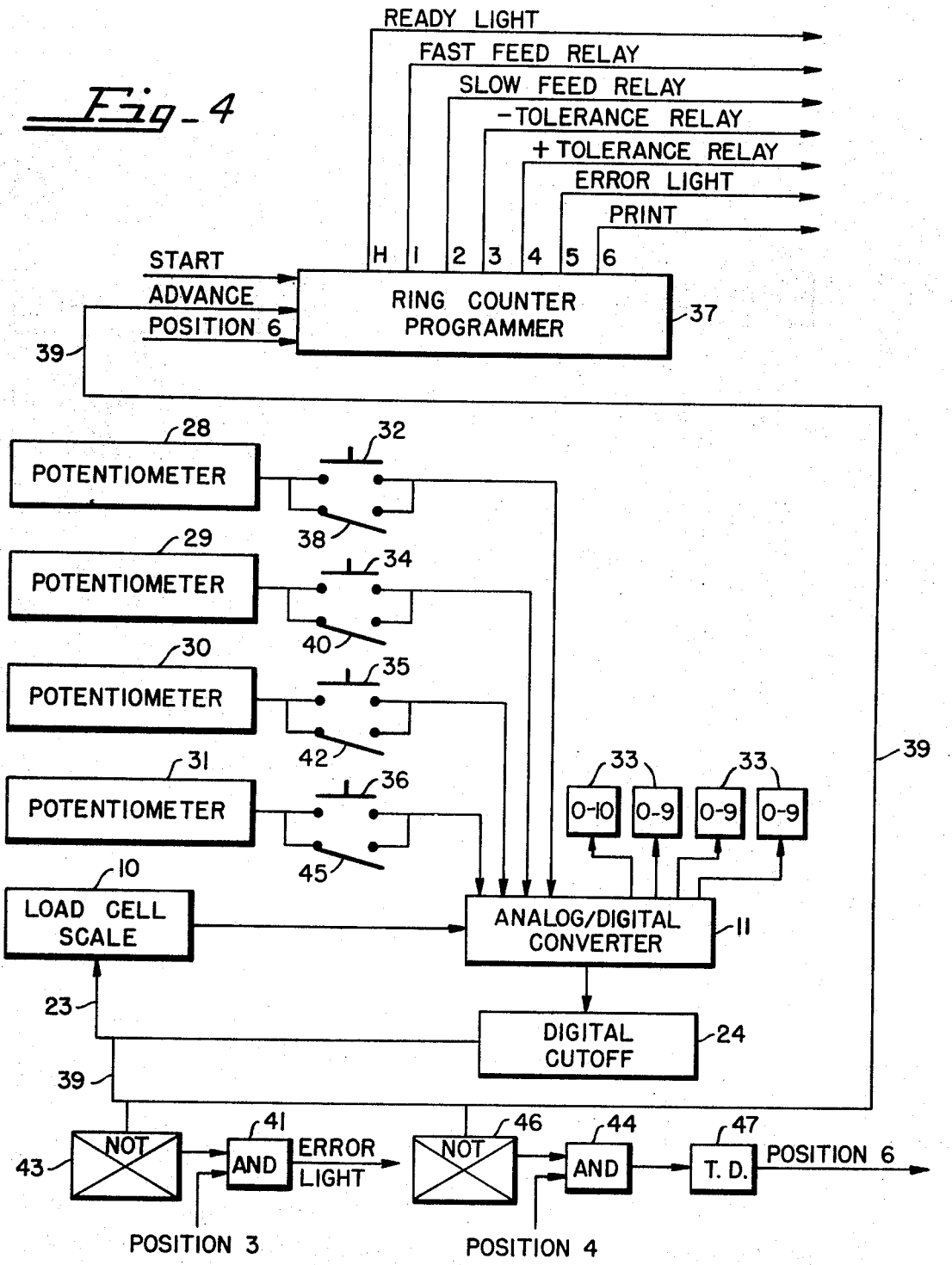

BATCH WEIGHING WITH NON-CUMULATIVE DIGITAL CUTOFF

BACKGROUND OF THE INVENTION

The invention relates to systems for detecting coincidence between the output of a condition responsive digital signal source and a selector for selecting the condition which may be, for example, weight on a batching scale or parts on a counting scale.

SUMMARY OF THE INVENTION

Specifically, the invention envisions the use of a converter for changing analog signals which are in accordance with first and second conditions, such as the weight of two batch ingredients upon a weighing scale, to digital signals with means for canceling digital signals corresponding to the first condition, whereby the digital signals corresponding to the second condition start from a zero reference.

The objects of this invention are to improve digital cutoff systems, to improve techniques in weighing materials in a batching process, and to provide a digital batching system of superior accuracy.

BRIEF DESCRIPTION OF THE DRAWINGS

FIG. 4 is a block diagram of the batch weighing scale system shown in FIG. 1 with a programmer attached for automatic operation.

DESCRIPTION OF THE PREFERRED EMBODIMENT

Figure 2:
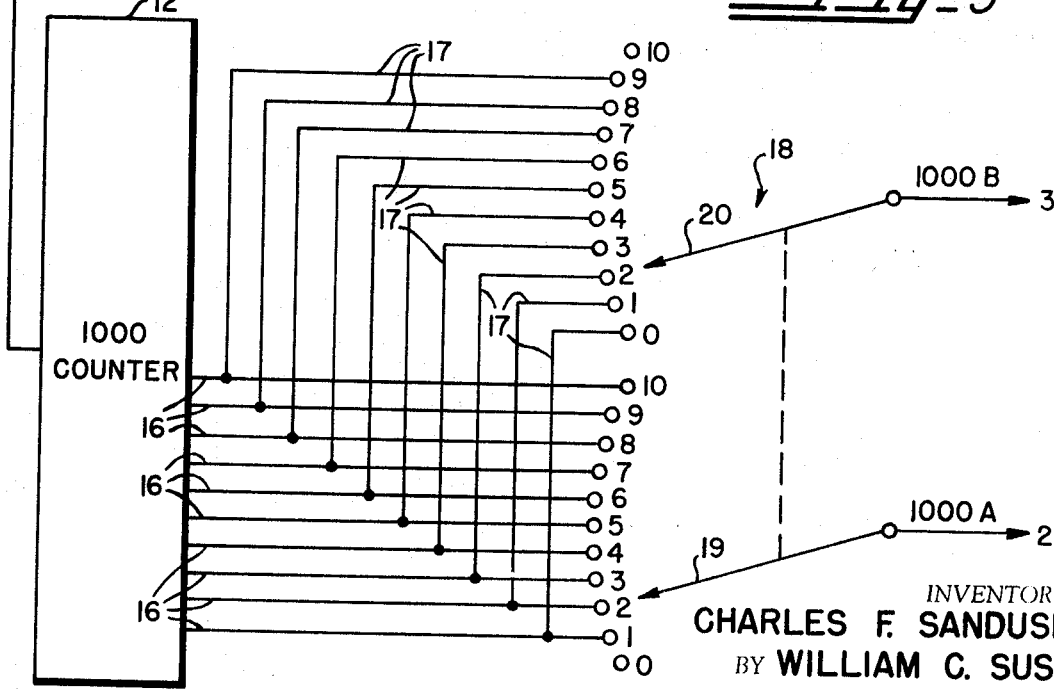
FIG. 2 is a wiring diagram showing part of the analog-to-digital converter and part of the digital cutoff shown in FIG. 1.

A load cell scale 10 and an analog-to-digital converter 11 are disclosed in the commonly assigned U.S. application Ser. No. 557,708 filed June 15, 1966 in the name of Robert D. Kohler. The weighing scale 10 establishes an analog signal (voltage) corresponding to the weight of an object being weighed and the converter 11 produces counterbalancing voltage steps. Counters 38-41 shown in the pending application accumulate the weight readout count; their counterparts are shown as counters 12-15 in FIG. 2. One of the four identical counters is shown in detail in FIG. 6 of the pending application and has 10 sustained output leads. The 1,000 place counter 12 has 10 sustained output leads 16 (digital signals in accordance with load upon the scale) ending in terminals identified as "1-10," respectively. The counter 12 is a ring counter but differs from the conventional ring counter in that as the count proceeds the stages do not turn off but rather remain on to put sustained outputs on the leads 16 until at the tenth count all 10 stages are on. The 1,000 place counter 12 also has 10 additional output leads 17 connecting the output leads 16 to additional terminals identified as "0-9." The "1" terminal shown in the lower part of FIG. 2 is connected to the upper "0" terminal, the lower "2" terminal is connected to the upper "1" terminal, etc. The lower set of terminals includes a blank "0" terminal and the upper set includes a blank "10" terminal. One count in the counter 12 produces an output signal at lower terminal "1" and at its connected terminal "0," two counts in the counter 12 produces such output signals plus an output signal at lower terminal "2" and at its connected terminal "1," etc.

A ganged switch 18 is used to select the 1,000 place in a desired weight. As shown in FIG. 2, the selected digit in the 1,000 place of the desired weight is a "2." The lower switch deck 19 receives a two digital signal (indicated as 1000A-2) while the upper switch deck 20 receives a three digital signal (indicated as 1000B-3). Similar ganged switches not shown are used to select the 10 and 100 places in the desired weight; the digital signals in the 10 place being indicated as 10A and 10B and the digital signals in the 100 place being indicated as 100A and 100B, it being understood that the counters 13 and 14 each have double sets of sustained output leads and terminals which are similar to those shown connected to counter 12. Counter 15 (one place) has only a single set of sustained output leads and terminals which are like leads 16 and their terminals and a single-decked switch for selecting the 1 place in a desired weight as indicated by output 1A in connection with counter 15.

Figure 1:
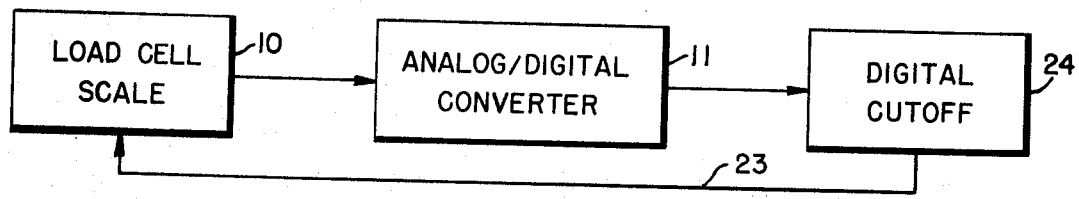
FIG. 1 is a block diagram of an electrical or electronic batch weighing scale system.
Figure 3:
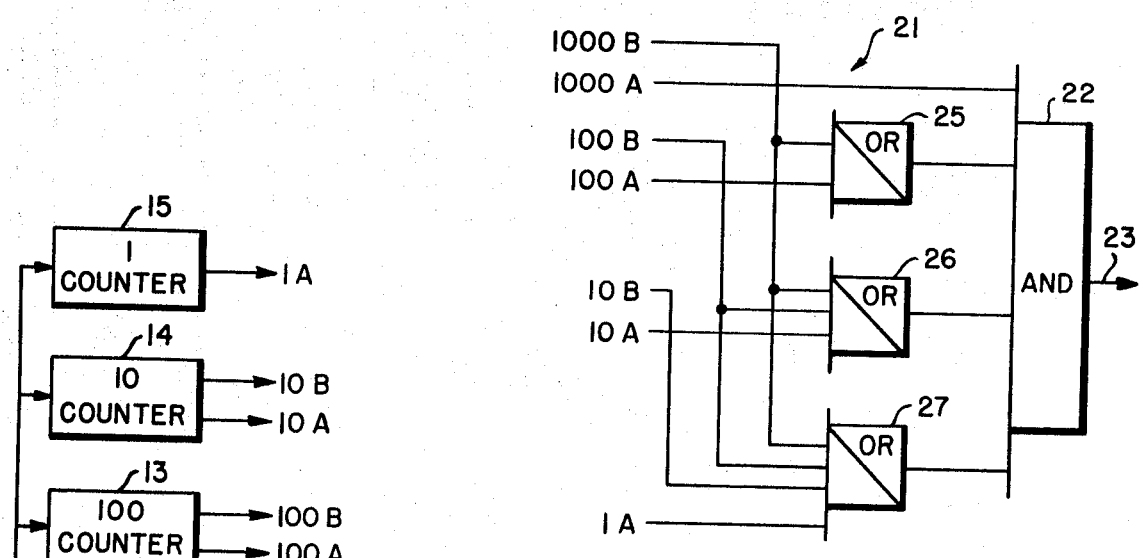
FIG. 3 is a block diagram showing the rest of the digital cutoff.

The digital cutoff is useful in a weighing system which automatically batches differing weights of several ingredients into a weigh single hopper. The switches are moved to select a desired weight having four number places, the switches connecting the outputs 1000A and B, 100A and B, 10A and B, and 1A to a coincidence circuit 21 shown in FIG. 3. As the first material flows onto the scale, sustained output digital signals appear at the terminals until the coincidence circuit detects coincidence between the digital signals and the desired weight, whereupon the circuit 21 which includes an AND gate 22 produces a cutoff signal 23 which controls a relay that in turn controls a valve cutting off the flow of the material onto the scale. Relays in weighing scale batching system for dribble cutoff, final cutoff, and over and under tolerance detection are disclosed in U.S. Pat. No 3,106,974 issued Oct. 15, 1963 in the name of Roger B. Williams Jr. For the sake of simplicity, FIGS. 1-3 disclose a digital cutoff 24 for one material; digital cutoff 24 includes the switch 18, three switches not shown for counters 13-15, and the coincidence circuit 21.

The coincidence circuit 21 also includes an OR gate 25 which receives the 1000B and 100A signals, an OR gate 26 which receives the 1000B, 100B, and 10A signals, and an OR gate 27 which receives the 1000B, 100B, 10B and 1A signals. The three outputs of the OR gates partially enable the AND gate 22 which is completely enabled by the 1000A signal.

Ordinarily in operation, the desired weight of one batch ingredient is selected by positioning the four switches (one shown as switch 18) to their respective terminals. As the batch ingredient flows onto the scale 10, digital signals are produced. For example, if the number chosen is 2,875 pounds, two counts in the 1,000 counter 12, eight counts in the 100 counter 13, seven counts in the 10 counter 14, and five counts in the one counter 15 produce the desired digital signals at the respective terminals which are transferred by the switches as a 1000A signal directly to the AND gate 22, a 100A signal to the OR gate 25, a 10A signal to the OR gate 26, and a 1A signal to the OR gate 27. The three outputs of the OR gates and the direct 1000A signal enable the AND gate 22 which then produces its cutoff signal 23 to cut off the flow of material to the scale 10.

If, however, a large lump of material falls upon the scale just prior to cutoff, the weight may run quickly beyond the coincidence point. In the above example, the desired weight is 2,875 pounds. If three counts are entered in the 1000 counter 12, sustained signals appear on terminals "1," "2" and "3" at lower switch deck 19 and on terminals "0," "1" and "2" at upper switch deck 20. The lower switch deck 19 applies the 1000A-2 signal directly to the AND gate 22 and the upper switch deck 20 applies the 1000B-3 signal to the three OR gates 25-27 as overriding signals so that the AND GATE 22 produces its cutoff signal 23 even though too much load is upon the scale. The usual coincidence circuit can sense coincidence only and not coincidence or condition beyond coincidence as does the circuit 21.

Similarly in overweight circumstances, a 100B signal is applied to OR gates 26 and 27 as an overriding signal and signal 10B is applied to OR gate 27 as an overriding signal. The arrangement is not necessary in the least significant place (1A signals).

Each of the counters 12-15 is a condition responsive digital signal source for each place in a number to be selected, the number being in accordance with a desired condition, e.g. weight. Each of the sources produces, as load is placed upon the scale 10, a desired signal corresponding to a desired digit and each of the sources, except the least significant, also produces an additional digital signal corresponding to the next higher digit whenever the weight of the load upon the scale is higher by one digit in the respective place. The circuit 21 is responsive to the desired digital signals in the absence of any additional digital signal and produces a normal output signal for each place in the number (signal 1000A and outputs of the three OR gates when signals 100A, 10A and 1A are applied to the OR gates) and also is responsive to any said additional digital signal to produce an overriding output signal (outputs of the three OR gates when signals 1000B, 100B and 10B are applied to the OR GATES) for all places of significance less than the place corresponding to the additional digital signal. The overriding output signals take the place of the normal output signals resulting in one output signal for each place in the number. The AND gate 22 receives the four output signals and produces a cutoff signal 23 at coincidence or beyond coincidence.

Essentially the digital cutoff system is for obtaining a desired condition, e.g., weight, and includes means for comparing a condition responsive digital signal to a digital reference, such means including the terminals of leads 16, means (switch deck 19) for generating a first signal A when the digital signal equals the digital reference, and means (switch deck 20) for generating a second signal B when the digital signal is greater than the digital reference, no signals A or B being generated when the digital signal is less than the digital reference. The coincidence circuit 21 is means for controlling the desired condition in accordance with signals A and B.

The foregoing dribble cutoff, a preact cutoff, and the foregoing over and under tolerance detection are selected by means of potentiometers 28–31. In the foregoing example, for the sake of simplicity, a batch ingredient of 2,875 pounds was described as being weighed out with a single cutoff. In actual practice, there are dribble and preact cutoffs and over and under tolerance detection for each of the batch ingredients.

Still using the example of 2,875 pounds as the desired weight of the ingredient, this weight is selected by positioning the four switches to 2,875 (one shown as switch 18) as described above. If it is desired to have 2,800 pounds fed at a fast rate and 75 pounds fed at a slow rate, a preset weight of 75 pounds is selected by depressing a push button 32 to connect the potentiometer 28 to an analog-to-digital converter 11 and moving the slider of the potentiometer 28 until the analog-to-digital converter 11 reads 75 pounds on its indicators 33 (shown as indicators 42 in the above U.S. application Ser. No. 557,708). The voltage output from the potentiometer 28, as are the outputs from the potentiometers 29–31, is applied as an input to the analog-to-digital converter 11 in the same manner as the voltage output from the load cell scale 10 is applied. The analog signal from the potentiometer 28 may be considered as a fake analog signal from the load cell scale 10 as an aid in understanding the invention. The weighing scale 10 produces analog signals in accordance with load upon the scale and the potentiometers or preset means 28–31 produces analog signals in accordance with desired preset weights and the converter 11 changes the combined analog signals to digital signals which are indicated in terms of weight by the indicators 33. When the push button 32 is released, the indicators 33 reads zero. As hereinafter described, the 75 pounds preset causes the first or dribble cutoff to come when 2,800 pounds of the ingredient is upon the scale (2,875 pounds minus the preset 75 pounds). In short, presetting of the converter 11 is accomplished by adjusting the potentiometers 28–31.

If it is desired to have the preact cutoff come 5 pounds before the desired weight of 2,875 is upon the scale because of material still falling upon the scale after cutoff, the inertia of the mechanical control system, etc., a push button 34 is depressed to connect the potentiometer 29 to the converter 11 and the slider of the potentiometer 29 is moved until the indicators 33 reads 5 pounds. Release of the push button 34 returns the indicators 33 to zero.

If it is desired to have an under tolerance detection of 3 pounds, a push button 35 is depressed to connect the potentiometer 30 to the converter 11 and the slider of the potentiometer 30 is moved until the indicators 33 reads 3 pounds. Release of the push button 35 returns the indicators 33 to zero.

If it is desired to have an over tolerance detection of 3 pounds, a push button 36 is depressed to connect the potentiometer 31 to the converter 11 and the slider of the potentiometer 31 is moved until the indicators 33 read minus 3 pounds. Release of the push button 36 returns the indicators 33 to zero.

Automatic operation is programmed by a conventional ring counter programmer 37 which have seven output positions.

In programmer position "H," the programmer output causes a ready light to light.

A "Start" signal applied to the programmer 37, by a start button, causes it to advance from position "H" to position "1." The ready light goes out and the position "1" output signal from the programmer 37 operates a "Fast Feed Relay" which both opens a valve to feed the batch ingredient onto the scale 10 and closes a contact 38 in parallel with the push button 32. Closing of the contact 38 applies the preset analog signal corresponding to 75 pounds from the potentiometer 28 to the converter 11 so that the indicators 33 reads 75 pounds before load is applied to the scale. At coincidence (2,800 pounds upon scale), the cutoff signal 23 as described above operates the fast feed relay which then both closes the valve feeding the batch ingredient onto the scale 10 and opens the contact 38. The cutoff signal 23 also is applied as "Advance" signal 39 to advance the programmer 37 to position "2."

The position "2" output signal from the programmer 37 operates a "Slow Feed Relay" which both opens a valve to feed the batch ingredient onto the scale 10 and closes a contact 40 in parallel with the push button 34. Closing of the contact 40 applies the preset analog signal corresponding to 5 pounds from the potentiometer 29 to the converter 11. At coincidence (desired weight of 2,875 pounds should be on scale), the cutoff signal 23 operates the slow feed relay which then both closes the valve feeding the batch ingredient onto the scale 10 and opens the contact 40. "Advance" signal 39 (produced whenever cutoff signal 23 is produced) advances the programmer 37 to position "3."

The position "3" output signal from the programmer 37 partially enables an AND gate 41 and operates a "– Tolerance Relay" which closes its contact 42 in parallel with the push button 35. Closing of the contact 42 applies the preset analog signal corresponding to 3 pounds from the potentiometer 30 to the converter 11. If the weight upon the scale actually is the desired weight of 2,875 pounds, the converter 11 detects 2,875 pounds plus the fake 3 pounds (potentiometer 30), i.e., 2,878 pounds. As described above, the coincidence circuit 21 detects coincidence at coincidence and beyond coincidence so that coincidence is detected and the cutoff signal 23 is produced, meaning that the under tolerance check has been passed (sufficient load upon the scale). "Advance" signal 39 (produced whenever cutoff signal 23 is produced) advances the programmer 37 to position "4." However, if coincidence is not detected that means there is not sufficient load upon the scale. A NOT gate 43, because it does not receive an advance signal 39, applies its inverted output as an input to the partially enabled AND gate 41 (partially enable by programmer position "3" signal) which causes an "Error Light" to light.

The position "4" output signal from the programmer 37 partially enables an AND gate 44 and operates a "+ Tolerance Relay" which closes its contact 45 in parallel with the push button 36. Closing of the contact 45 applies the preset analog signal corresponding to minus 3 pounds from the potentiometer 31 to the converter 11. If the weight upon the scale actually is the desired weight of 2,875 pounds, the converter detects 2,875 pounds less the fake 3 pounds, i.e., 2,872 pounds.

If coincidence is not detected that means there is not too much load upon the scale (over tolerance check passed). A NOT gate 46, because it does not receive an advance signal 39, applies its inverted output as an input to the partially enabled AND gate 44 which applies its output to a time delay 47 that after the expiration of the delay applies its output to force the advance of the programmer 37 to position "6." The position "6" output signal from the programmer 37 causes a printer to operate which when printing is completed closes a limit switch resetting the programmer 37 to its "H" position (ready light lit). However, if coincidence is detected that means there is too much load upon the scale. Coincidence produces the "Advance" signal 39 to advance the programmer 37 from position "4" to position "5." The position "5" output signal from the programmer 37 causes "Error Light" to light.

In addition to the advantage of using potentiometers 28-31 of low cost with negligible error because the preset indication is made by the basic converter 11 which has very high accuracy, the one set of digital control switches controls the four conditions of first cutoff, preact and plus and minus tolerance, and the one coincidence circuit 21 also is used to control such four conditions.

The programmer 37 is enlarged to have fourteen positions for batching two ingredients. The enlarged programmer is numbered 37a in FIG. 5. A control panel 48 for one ingredient includes four knobs 49 for setting the weight selecting switches (one shown in FIG. 2 and numbered 18), four knobs 50 for operating the push buttons 32, 34, 35 and 36 shown in FIG. 4, and four knobs 51 for operating the sliders of the potentiometers 28-31 shown in FIG. 4. A control panel 48a for the second ingredient includes knobs 49a, 50a and 51a. Similar reference numbers refer to parts alike in structure and in function. There is one coincidence circuit 21 for each of the control panels. The digital cutoff 24 is used for the first ingredient and a similar digital cutoff 24a is used for the second ingredient.

The analog-to-digital converter 11 as disclosed in the foregoing U.S. application Ser. No. 557,708 includes a tare circuit 58 (circuit 52 in the pending application) which produces voltage to counterbalance the load cell voltage in accordance with the setting of four tare knobs (knobs 168 and 327 in the pending application). The tare knobs operate switches shown in FIG. 10 of the pending application. Four input arrows to the converter 11 are identified as "1," "10," "100" and "1000" in FIG. 5 indicating the four number places of tare which can be entered. For example, an empty container weighing 1,000 pounds placed upon the load cell scale 10 causes a load cell voltage which is canceled by entering "1,000" tare causing the indicators 33 to indicate zero. The non-sustained output leads of the counters 12-15 (counters 38-41 in the pending application) in the converter 11 are connected to four storage counters 52-55 so that the count in the converter 11 can be transferred to the storage counters. The 1,000 place storage counter 52 has 10 output leads 56. The other storage counters 53-55 each has nine output leads, each such set of nine output leads being indicated by a single output arrow from the respective storage counters 53-55. Each of the storage counter output leads controls a relay (not shown) which when there is an output signal on the respective lead closes a switch 57 in circuit with such lead. The switches 57 function to close the tare circuits shown in FIG. 10 of the above U.S. application Ser. No. 557,708 which as shown in the pending application are closed by manual operation of the tare knobs 168 and 327. In the system of the invention, either manually operated tare or the relay operated switches 57 are used.

The weighing of one batch ingredient (2,875 pounds example) has been described above in connection with FIG. 4 with advance of the programmer 37 from position "4" to position "6" and back to position "H" (ready light lit). In weighing two batch ingredients, completion of printing in position "6" advances the programmer 37a to position "7" (reset and read).

Figure 5:
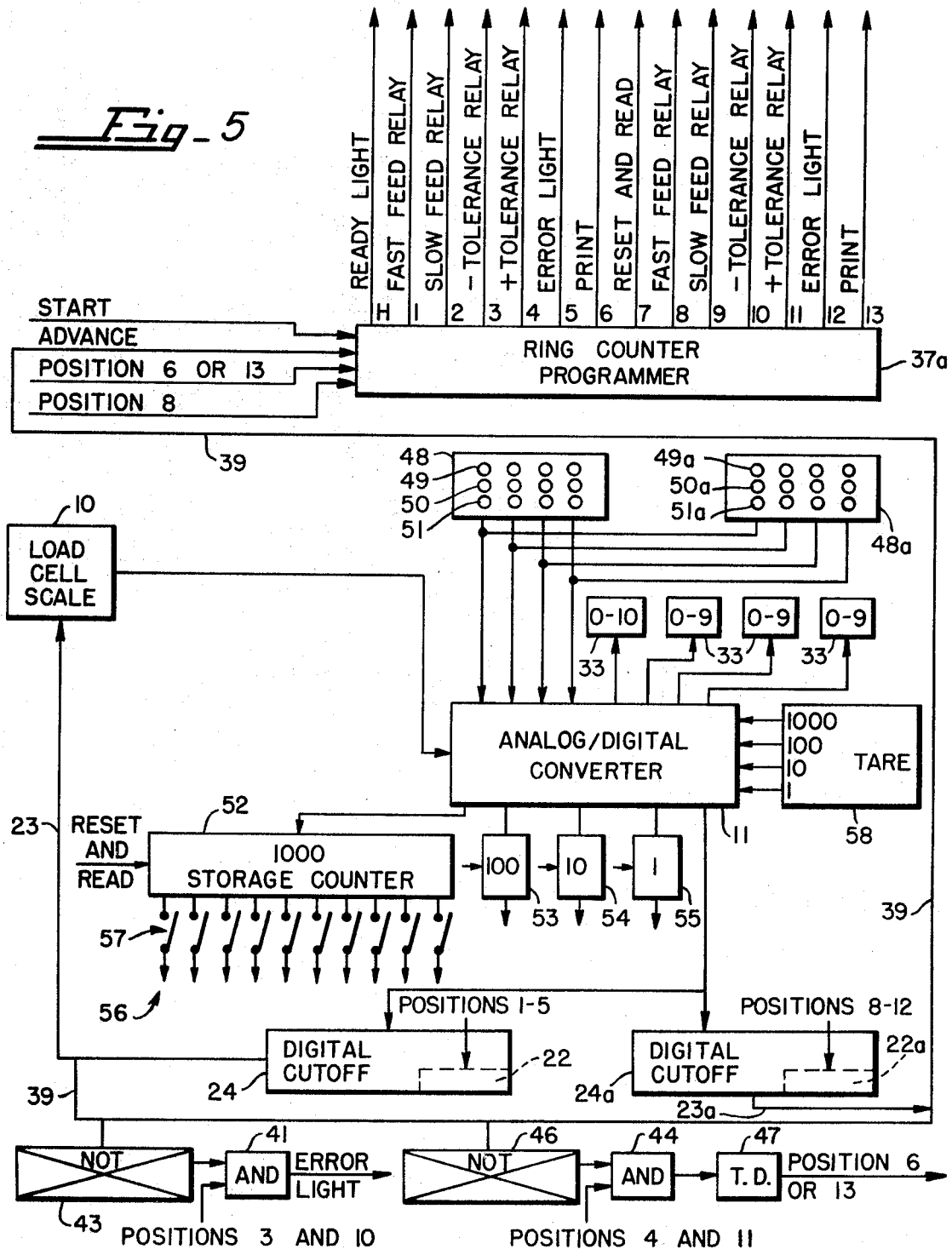
FIG. 5 is a block diagram of the batch weighing scale system shown in FIG. 4 modified to weigh two ingredients of a batch.

Also, in weighing two batch ingredients, the AND gate 22 (FIG. 3) is provided with an additional input as indicated in FIG. 5 which is provided by the programmer 37a when in positions "1-5" so that the AND gate 22 is enabled only during the weighing of the first batch ingredient. Similarly, the AND gate 22a (FIG. 5) is provided with an input by the programmer 37a when in positions "8-12" so that the AND gate 22a is enabled only during the weighing of the second batch ingredient. Also, when weighing two batch ingredients, the AND gates 41 and 44 are partially enabled by signals provided by the programmer 37a in positions "3 and 10" (AND gate 41) and positions "4 and 11" (AND gate 44).

Continuing with the above example, the first batch ingredient (2,875 pounds) is upon the scale 10 so that the indicators 33 reads 2,875 pounds, the storage counters 52-55 contain a count of zero, and the programmer 37a is in position "7." The programmer position "7" signal is used to reset the storage counters 52-55 to make sure that they read zero and to transfer the number 2,875 from the converter 11 to the storage counters 52-55. The output signals from the counters 52-55 close the respective switches 57, whereupon the input to the converter 11 from the tare circuit 58 resets the converter 11 to zero. For the sake of simplicity, the invention, i.e., resetting the converter 11 to zero in a digital cutoff system, can be understood by picturing the elimination of the storage counters 52-55 and the switches 57. In such case, the operator simply sets the tare circuit 58 to the reading of the indicators 33, i.e., to "2,875," manually to reset the converter and its indicators 33 to zero. Resetting the converter 11 advances the programmer 37a to position "8" or, for the sake of simplicity, a manually operable push button is used to provide the "Position 8" input signal to the programmer 37a. In position "8," the converter indicators 33 reads zero and the storage counters 52-55 read "2,875" (2,875 pounds upon scale 10) or, if the storage counters 52-55 are not used, the manually operable tare knobs (not shown) of the tare circuit 58 are set to "2,875."

Programmer position "8" corresponds to programmer position "1" (Fast Feed Relay). The programmer 37a moves from position "8" through positions "9-12" to position "13" in the same manner as programmer 37 moves from position "1" through positions "2-5" to position "6," as described above. The weight of the second batch ingredient as selected and controlled by the settings on the control panel 48a then in upon the scale 10. The position "13" output signal from the programmer 37a causes the printer to operate which when printing is completed closes a limit switch resetting the programmer 37a to its "H" position (ready light lit).

The ring counter programmer 37a can be extended for batching a third ingredient in the same manner as it is extended for batching the second ingredient and after the storage counters are reset the converter will reflect the gross weight on the scale prior to transferring the count.

Resetting the converter 11 to zero while the first material is upon the scale enables noncumulative weighing of multiple materials with digital control of each material. Essentially the digital cutoff system of the invention includes condition responsive means (load cell scale 10) for producing analog signals in accordance with first and second conditions (first and second weights of two batch ingredients), converter means (converter 11) for changing the analog signals to digital signals, means for canceling the digital signals (manually or automatically operable tare circuit 58) corresponding to the first condition, whereby the digital signals corresponding to the second condition start from a zero reference, and circuit means (digital cutoffs 24 and 24a) for producing a cutoff signal one for each condition.

It is to be understood that the above description is illustrative of this invention and that various modifications thereof can be utilized without departing from its spirit and scope.

Having described the invention, we claim:

1. A digital cutoff system comprising, in combination, a weighing scale, means for producing voltage in accordance with load upon the scale, means for so producing digital signals in accordance with said voltage that said digital signals represent load upon the scale, means for selecting the desired weights of several materials, means for detecting coincidence between the digital signals and the desired weights and for producing cutoff signals to control the weight of each material upon the scale, means for storing cumulative information corresponding to the digital signals, and means for canceling the digital signals in accordance with the cumulative information, whereby noncumulative weighing of multiple materials is accomplished with digital control of each material.

2. A digital cutoff system comprising, in combination, a weighing scale, means for producing voltage in accordance with load upon the scale, means for so producing digital signals in accordance with said voltage that said digital signals represent load upon the scale, means for selecting the desired weights of several materials, means for detecting coincidence between the digital signals and the desired weights and for producing cutoff signals to control the weight of each material upon the scale, the means for producing digital signals producing a first set of digital signals in accordance with the weight of a first material upon the scale, and means for canceling the first set of digital signals while the first material remains upon the scale, the means for producing digital signals producing a second set of digital signals in accordance with the weight of a second material added to the first material upon the scale, whereby noncumulative weighing of two materials is accomplished with digital control of each material.

3. A digital cutoff system according to claim 2 wherein means are provided for storing cumulative information corresponding to both sets of digital signals.

4. A digital cutoff system comprising, in combination, weighing scale means for producing analog signals in accordance with the desired weights of a plurality of materials successively placed upon the scale means, analog to digital converter means for changing the analog signals to digital signals, means operable while one or more of the materials are upon the scale for resetting the converter means to cancel the digital signals corresponding to said one or more materials, and circuit means for producing a cutoff signal in response to digital signals corresponding to the desired weight of each of said plurality of materials, whereby noncumulative weighing of multiple materials is accomplished.

* * * * *